Nov. 18, 1952    R. V. ESTEVE    2,618,177
SAW SHARPENING MACHINE
Filed Dec. 22, 1950    3 Sheets-Sheet 1

Inventor
Ramon Valero Esteve
By
Attorney

Nov. 18, 1952   R. V. ESTEVE   2,618,177
SAW SHARPENING MACHINE
Filed Dec. 22, 1950   3 Sheets-Sheet 2

Inventor
Ramon Valero Esteve
By
Attorney

Nov. 18, 1952 R. V. ESTEVE 2,618,177
SAW SHARPENING MACHINE
Filed Dec. 22, 1950 3 Sheets-Sheet 3
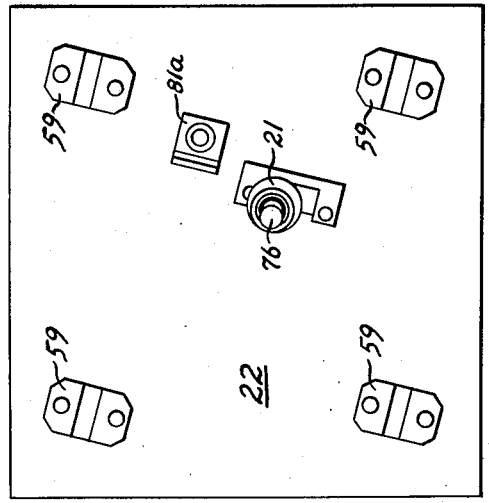
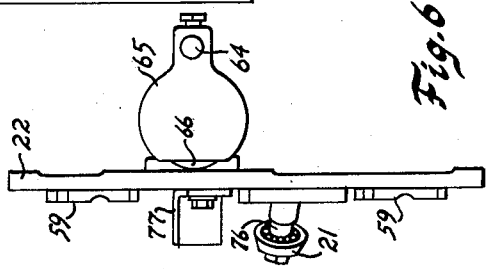
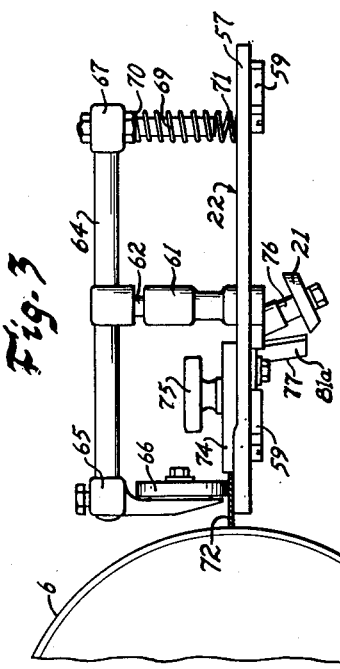
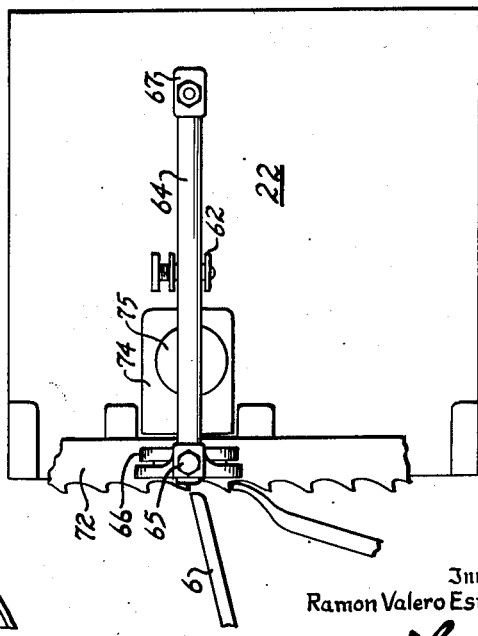
Inventor
Ramon Valero Esteve
By
Attorney Patented Nov. 18, 1952

2,618,177

UNITED STATES PATENT OFFICE 2,618,177

SAW SHARPENING MACHINE

Ramón Valero Esteve, Fraga-Huesca, Spain

Application December 22, 1950, Serial No. 202,155
In Spain December 27, 1949

1 Claim. (Cl. 76—43)

This invention relates to an improved saw sharpening machine particularly suitable for the automatic sharpening of a saw such as the usual band saw.

It is important in a saw sharpening machine that a perfect cut edge be made on the saw yet the machine must be rapid in operation. In addition, the machine should have a small number of parts making it economical in manufacture as well as inexpensive in maintenance.

In many of the prior devices the machines have been provided utilizing a belt or a plurality of belts and in which the grinding wheel has been caused to move towards and away from the saw. By reason of the vibration caused by the rotation of the grinding wheel, it has been found in some cases that such devices have not produced an even cut. In the belt operated machines difficulty has been had by reason of the differences in speed which exist between the grinding wheel and the pawl mechanism which moves the saw so that its various teeth may be sharpened. In still other devices difficulty has been had in that the grinding wheel has been brought into contact with the saw blade at such a rate that the impact produces excessive and uneven wear of the grinding wheel.

The present invention aims to overcome the difficulties and disadvantages of prior devices by providing a saw sharpening machine without belts and in which adjustment means are provided so that saws of different pitch and tooth depth may be sharpened. In addition, the machine may be adjusted for varying thicknesses of cuts so that a slightly dulled saw need not be ground away to the extent of a badly dulled saw.

Another object of the invention is to provide a saw sharpening machine which is simple and economical in manufacture, efficient in operation, and durable in use.

In accordance with the invention a saw sharpening machine is provided in which the grinding wheel is carried by the motor shaft. A sawblade holding carriage is provided to move the sawblade toward and away from the grinding wheel as the tooth of the saw is sharpened. A pawl mechanism is arranged for operation by the motor through a worm gear and linkage mechanism, the mechanism being adjustable to vary the stroke of the pawl in moving the saw past the grinding wheel as the teeth are successively ground. The carriage is arranged to be moved towards and away from the grinding wheel by a cam mechanism directly connected with the motor, and the carriage is adjustable as to the degree of its movement towards and away from the grinding wheel. Another adjustment is provided for the carriage so that the position of the saw tooth with respect to the grinding wheel may be varied so as to predetermine the amount of material to be removed from the face of the saw tooth during each cut.

The construction is advantageous in that the machine may be mounted in any suitable convenient location either on a stand or table, or if desired, the machine may even be moved to the location of the sawing machine so that the teeth of the sawblade may be sharpened while the blade is in position on the sawing machine.

Other objects and advantages of the invention will be apparent from the following description and from the accompanying drawings which show, by way of example, the embodiment of the invention.

In the drawings:

Figure 3 is a side view of the saw holder carriage.

Figure 4 is a top view corresponding to Figure 3.

Figure 5 is a bottom view corresponding to Figure 3.

Figure 6 is an end elevation taken from the left side of Fig. 4 with the saw 72 removed.

Figure 1:
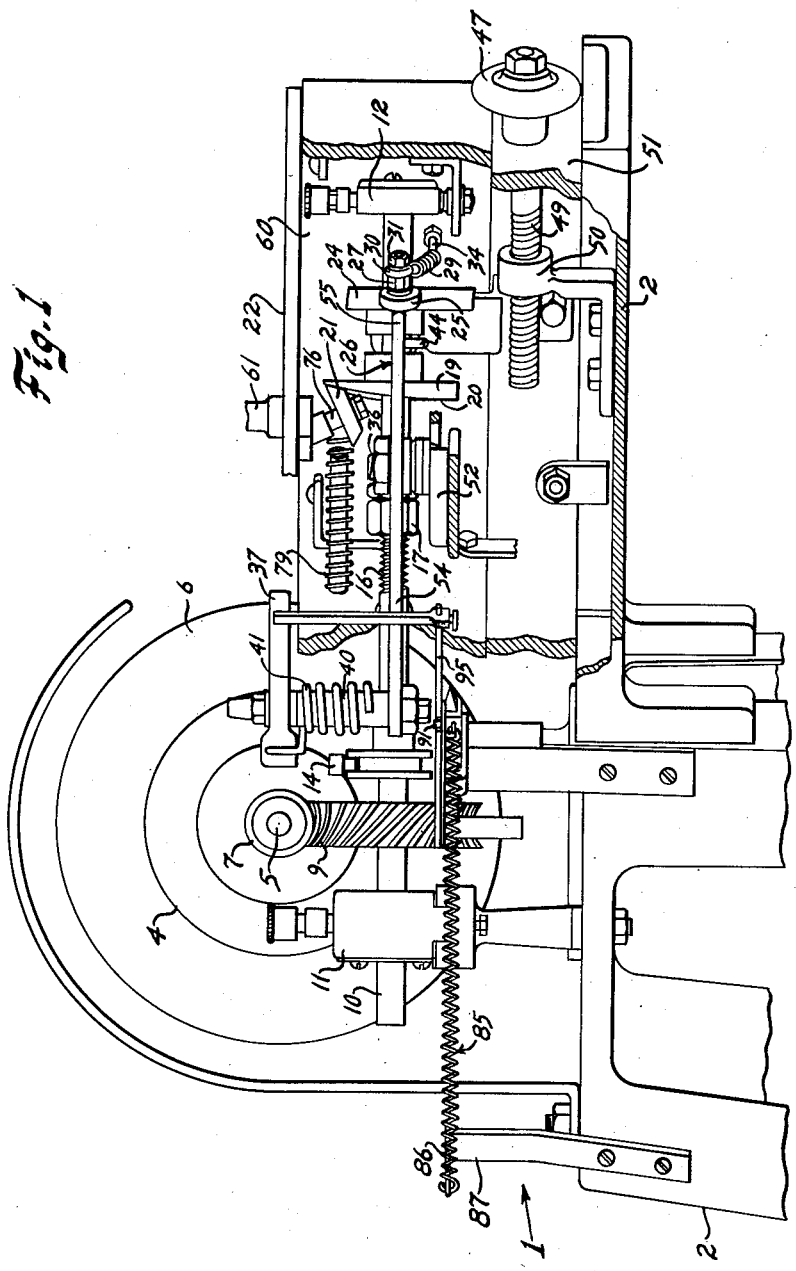
Figure 1 is a side view of a saw sharpening machine in accordance with the invention with a portion of the casing broken away to show the mechanism therein.
Figure 2:
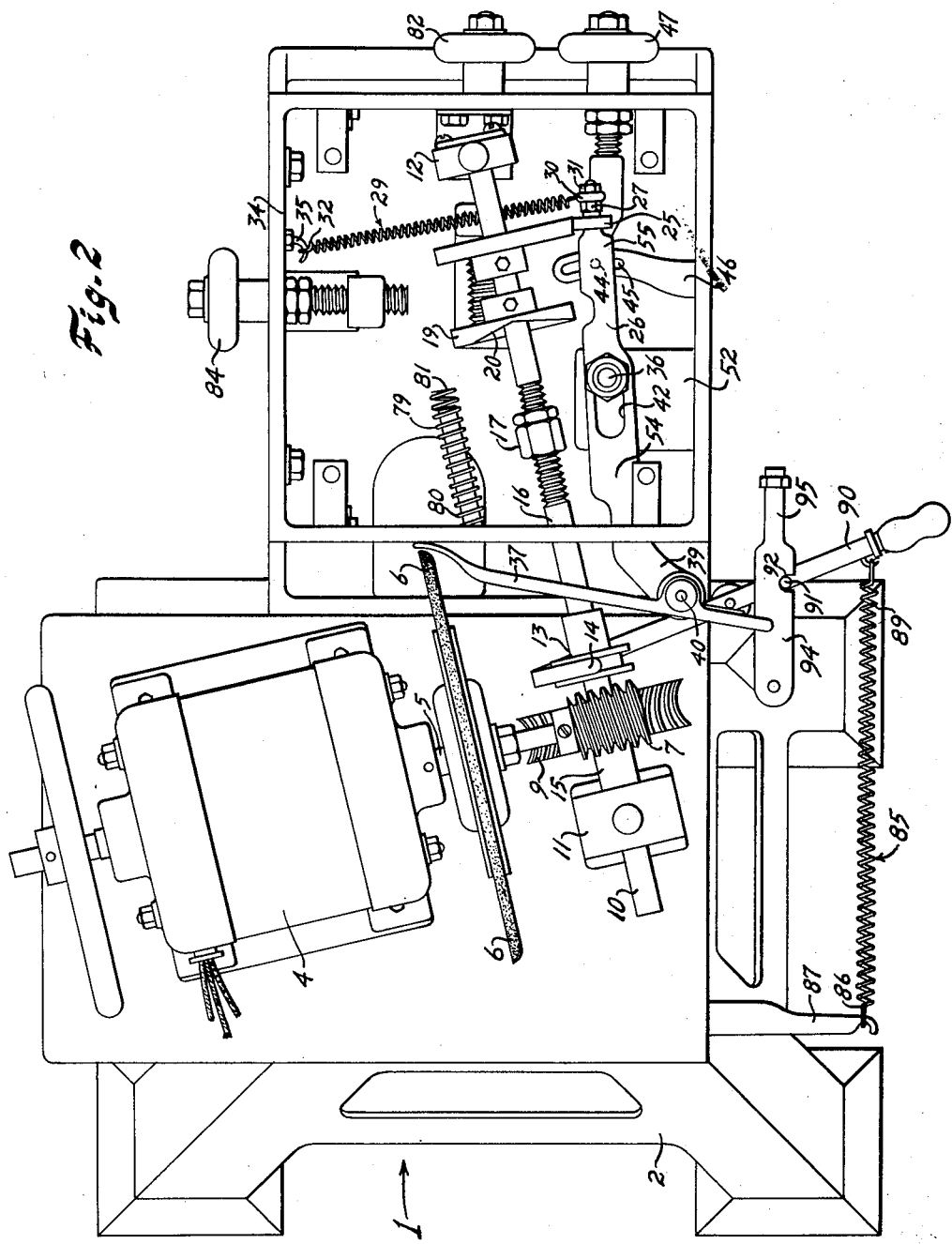
Figure 2 is a top view of the machine with the saw holder carriage removed.

Referring to the drawings there is shown a saw sharpening machine 1 mounted on a base 2 on which is supported a motor 4 having attached to its shaft 5 a grinding wheel 6. Also attached to the shaft 5 of the motor 4 is a worm gear 7 adapted to engage with a ring gear 9 carried by a shaft 10 journalled in bearings 11 and 12 and adapted to actuate the pawl mechanism. A clutch 13 having a clutch idler 14 is adapted to connect driving portion 15 of the shaft 10 with its driven portion 16. A connection fitting 17 is used to divide the driven portion 16 of the shaft into parts to facilitate the assembly of the mechanism. Alternatively, the connection fitting 17 might be made utilizing any standard universal joint construction.

At the end of the driven shaft 16 is a cam member 19 having a cam face 20 adapted to engage a cam rider 21 extending from the bottom of a saw holder carriage 22. Also on the driven shaft 16 is an eccentric cam member 24 adapted to engage an idler 25 on a linkage member 26. The idler 25 is attached to the end of the linkage member 26 by a nut 27 or other suitable construction. A spring 29 has one end 30 held at the end of the linkage member 26 by a second nut 31. The spring 29 has its other end 32 secured to the casing wall 34 by a hook 35.

The linkage member 26 is pivotly mounted at 36 intermediate its ends. A pawl 37 is swingably mounted at end 39 of the linkage member 26 by a pivot member 40, a spring 41 being used to normally urge the pawl member to swing in the clockwise direction.

The linkage member 26 is made with a longitudinally extending slot 42 to provide a bearing surface for engagement with the pivot mounting 36. In order to hold the linkage member 26 in position so that the idler 25 will contact the surface of the eccentric cam 24, the linkage member 26 is fitted with a downwardly extending pin 44 engaging in a slot 45 in an arm 46 secured to the frame of the machine.

Means are provided to vary the length of the stroke of the pawl 37 by varying the lengths of the parts of the linkage member 26 so that the machine may be used to sharpen saws with teeth of various pitch. This adjustment is achieved by the rotation of a control member 47 having a screw 49 turning in a threaded flange 50 attached to the base 2 of the machine. The rotation of the control member 47 causes a sliding carriage portion 51 to move transversely across the base of the machine carrying with it a bracket 52 to which is attached the pivot mounting 36. By this means the lefthand end 54 of the linkage member 26 is varied in length with respect to its righthand end 55 resulting in a difference in the amount of movement of the end of the pawl 37 for each rotation of the eccentric cam 24.

The saw carriage holder 22 is made with a flat base 57 having on its lower surface a plurality of ball bearing holders 59 so as to facilitate the carriage movement on ball bearing raceways on the top edges of upper casing portion 60. The saw carriage holder 22 has an upwardly extending center post 61 adapted to receive a T fitting 62 carrying a cross arm 64 at one end of which is an adjustable fitting 65 carrying a roller 66. The cross arm 64 has at its opposite end a spring mount 67 carrying a spring 69 having one end 70 abutting against the under side of the spring mount 67 while other end 71 of the spring 69 abuts against the face of the flat base 57. By reason of this construction the roller 66 may be swung over the side of a saw blade 72 to hold it against the top surface of the flat base 57 and may be easily swung away to release the sawblade.

In order to hold the sawblade 72 against the grinding wheel 6 during the sharpening operation, a backing member 74 is positioned on the flat base 57 and secured by a screw 75 so that it may be adjustably positioned for sawblades of different widths. The cam rider 22 is carried by a shaft 76 suitably secured on the under side of the base member 57. In order that the base member 57 may be guided for movement towards and away from the grinding wheel 6, a plurality of guiding members 77 are attached to the under-surface of the base member 57 and adapted to slide against the inner side of the upper casing portion 60. The saw holder carriage 22 is yieldingly held away from the grinding wheel 6 by a spring 79 having one end 80 abutting against thrust bearing 80 while its other end 81 abuts against a flange 81a on the inner side of the upper casing portion 60 or against other suitable means attached to the flat base member 57.

In order that the depth of the cut in the sawblade may be varied, a control member 82 is provided to adjust the range of movement of the upper portion of the casing 60 so as to limit the degree of movement with which the sawblade 72 is moved against the grinding wheel 6 to provide for various desired depths of cut by the grinding wheel 6 into the base of the teeth of the saw 72.

In order that an adjustment may be had as to the amount or degree of the tooth face to be removed by each cut, a control 84 is provided for movement of the upper portion of the casing 60 along the length of the saw 72 and thus to adjust the position of the saw carriage 22 with respect to the grinding wheel 6. The rotation of the control member 84 makes it possible to adjust the machine to remove a comparatively small amount of material for a slightly dull saw while more material may be removed as desired as in the case of a badly dulled saw.

In sharpening a bandsaw, the machine may be set so that it will automatically cease its cutting operation after all of the teeth have been sharpened. This is accomplished by attaching a clamp or other suitable stop member to the blade of the saw so that after a complete revolution has been had, the clutch 13 is disconnected to stop further cutting operations. To do this a release mechanism is provided including a spring 85 with one end 86 connected to a bracket 87 carried by the base 2 and its other end 89 is connected to a lever 90 adapted to engage with the clutch idler 14 to disengage the clutch 13. The lever 90 is held in position to hold the clutch 13 in engagement by means of a pin 91 adapted to engage in a slot 92 of a pivoted locking member 94. The lever 90 is released when end 95 of the pivoted member 94 is contacted by the stop member or clamp attached to the sawblade, the release occurring as the locking member 94 is swung away from the lever 90 which is moved towards the left by the spring 85 to disengage the clutch.

In order that any desired tooth face contour may be cut, the motor 4 is mounted at an angle with respect to the line of travel of the sawblade 72, thus by changing the shape of the cam face 20 the desired contour is obtained. However, as the tooth face contour is set for each cam member by the shape of its cam surface, to cut a different tooth contour it is necessary to replace the cam member 19 with another having the desired cam face. Inasmuch as the shape of the cam face determines the relative speed with which the saw holder carriage approaches the grinding wheel, it is obvious that by a proper design of the cam face shape a gradual and easy movement of the carriage holder is had at the first contact of the grinding wheel with the edge thereby preventing uneven and undue wear of the grinding wheel. It should be noted that by reason of the construction of the machine compensation is automatically had in the case of teeth of unequal pitch inasmuch as the pawl approaches the tooth on the same side as the grinder, thus engaging each tooth before that particular tooth is sharpened.

From the preceding description it will be seen that a machine has been provided which is simple and economical in construction yet which is efficient in operation and durable in use.

While the invention has been described and illustrated with reference to a specific embodiment thereof, it will be understood that other embodiments may be resorted to without departing from the invention. Therefore, the form of the invention set out above should be considered as illustrative and not as limited in scope of the following claim.

I claim:

A saw sharpening machine comprising a base, a motor actuated grinding wheel supported by the base, a sawblade holder including a plate to contact the back edge of the sawblade to urge it against the grinding wheel and a resiliently urged roller to hold the side of the sawblade, a cam rotatable by the motor, a cam rider to engage the cam to move the sawblade holder toward the grinding wheel, resilient means to urge the sawblade holder away from the grinding wheel, an adjustable screw member to vary the position of the sawblade holder with respect to the grinding wheel, a pawl mechanism including a pivotably mounted operating arm for the pawl, the operating arm having a slotted bearing surface, a second screw member to vary the position of the pivot along the slotted bearing surface to vary the stroke of the pawl, and a third screw member to move the sawblade holder across the cutting edge of the grinding wheel to vary the amount of the cut, whereby the depth, thickness and position of the cut may be varied.

RAMÓN VALERO ESTEVE.

REFERENCES CITED

The following references are of record in the file of this patent:

UNITED STATES PATENTS

| Number | Name | Date |
|---|---|---|
| 297,566 | Bush | Apr. 29, 1884 |
| 315,715 | Bush | Apr. 14, 1885 |
| 360,679 | Gaskin | Apr. 5, 1887 |
| 433,866 | Knecht et al. | Aug. 5, 1890 |
| 579,837 | Parsons | Mar. 30, 1897 |

FOREIGN PATENTS

| Number | Country | Date |
|---|---|---|
| 92,088 | Germany | May 20, 1897 |
| 517,125 | Germany | Feb. 16, 1931 |